US007617284B2

(12) United States Patent
Salamuniccar

(10) Patent No.: US 7,617,284 B2
(45) Date of Patent: Nov. 10, 2009

(54) PUBLIC/PRIVATE/INVITATION EMAIL ADDRESS BASED SECURE ANTI-SPAM EMAIL PROTOCOL

(76) Inventor: Goran Salamuniccar, Ivana Zajca 8, Karlovac (HR) 47000

( * ) Notice: Subject to any disclaimer, the term of this patent is extended or adjusted under 35 U.S.C. 154(b) by 729 days.

(21) Appl. No.: 11/161,108

(22) Filed: Jul. 22, 2005

(65) Prior Publication Data
US 2005/0235041 A1 Oct. 20, 2005

(51) Int. Cl.
*G06F 15/16* (2006.01)
(52) U.S. Cl. .................. 709/206; 709/205; 709/207; 379/93.01
(58) Field of Classification Search ............. 709/206, 709/205, 207; 379/93.01
See application file for complete search history.

(56) References Cited

U.S. PATENT DOCUMENTS 7,366,761 B2 * 4/2008 Murray et al. ............. 709/206
2004/0111480 A1 * 6/2004 Yue ........................... 709/206
2004/0148358 A1 * 7/2004 Singh et al. ................ 709/207

* cited by examiner

*Primary Examiner*—Thu Ha T Nguyen

(57) ABSTRACT

The Secure Anti-Spam Email Protocol (SASEP) as proposed by this invention is based on public/private/invitation email address architecture. Each user that will register at any SASEP server will receive a public and a private email address. The public email address (e.g. user@domain.com) can be used as a regular email address or alias. The private email address (e.g. privatecode.user@domain.com) has to be in Bcc: field of all outgoing email messages. The user can also request arbitrary number of invitation email addresses (e.g. invitationcode.user@domain.com) that can be used for registration on web sites. The main advantage of SASEP is that the user can continue to use standard outgoing (SMTP) and incoming (POP3, IMAP or HTTP) email server and standard desktop or web email client. This is ensured by SASEP that defines an automatic mechanism for managing different lists and challenge system.

1 Claim, 1 Drawing Sheet

One possible configuration with two SASEP servers, three users, and one web site.

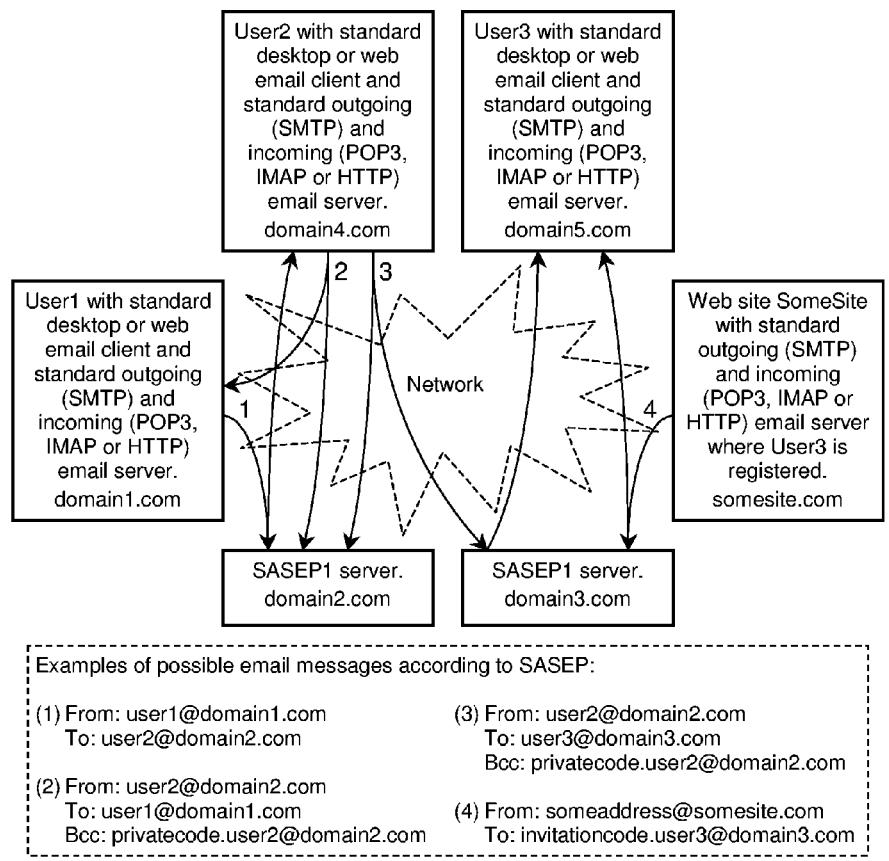
Figure 1: One possible configuration with two SASEP servers, three users, and one web site.

PUBLIC/PRIVATE/INVITATION EMAIL ADDRESS BASED SECURE ANTI-SPAM EMAIL PROTOCOL

Spam can be defined as the use of any electronic communication to send unsolicited commercial or non-commercial messages in bulk and refers to different media such as email, messaging, newsgroups, mobile phones and Internet telephony. There is a number of anti-Spam technologies proposed against Spam. However, each year the volume of Spam increases.

The major problem of the proposed solutions is, that, they either require that most of the Internet infrastructure needs to be changed, or that they oversee an important aspect that leaves space for continuing the operation of Spam. The example for the first case is a proposal of a challenge system that requires new email servers or new email clients. The example for the second case is a proposal of a whitelist approach that oversees a possibility that everybody can find out e.g. that the email address of the second author of some published paper is probably on a whitelist of the email address of the first author. The major problem with the filtering approach is that none can guarantee that the email from some sender we have already written before, or from some site we are registered at, will not be blocked. At the same time we have Spam email messages that are not interrupted at all by a filter.

BRIEF SUMMARY OF THE INVENTION

The Secure Anti-Spam Email Protocol (SASEP) as proposed by this invention can be implemented on some separate server accessible by the already available Internet infrastructure. The user can continue to use standard outgoing (SMTP) and incoming (POP3, IMAP or HTTP) email server and standard desktop or web email client. Two isolated efforts required by SASEP providing this are that the private email address has to be in Bcc: field of all outgoing email messages and that for registration on web sites invitation email addresses have to be used. Each user being registered at some SASEP server will receive public (e.g. user@domain.com) and private (e.g. privatecode.user@domain.com) email address as well as requested number of invitation email addresses (e.g. invitationcode1.user@domain.com, invitationcode2.user@domain.com, ... ). The rest is ensured by the SASEP server that implements automatic mechanism for managing different lists and challenge system.

BRIEF DESCRIPTION OF THE SEVERAL VIEWS OF THE DRAWING

FIG. 1 shows one possible configuration with two SASEP servers, three users, and one web site.

DETAILED DESCRIPTION OF THE INVENTION

A system for secure communication with a solution to the Spam problem, named the Secure Anti-Spam Email Protocol (SASEP), operates according to the following. The first step is, the user with standard desktop or web email client, standard outgoing email (SMTP) server and standard incoming email (POP3, IMAP or HTTP) server, registers on SASEP server. In the second one, SASEP server provides to the user the public email address (e.g. user@domain.com) and the private email address (e.g. privatecode.user@domain.com). After that, the user can use the public email address as a regular email address or alias, while the private email address has to be in Bcc: field of all outgoing email messages. When the user wants to register on some web site, she/he requests from SASEP server the invitation email address (e.g. invitationcode.user@domain.com) for registration. It should be noted that the user can request from SASEP server a new private email address and an additional invitation email addresses at any time.

One possible configuration with two SASEP servers, three users, and one web site is shown in FIG. 1. Additionally, examples of possible email messages are given. The first user (user1) does not use SASEP, while the second (user2) and third (user3) one use SASEP. In the first case user1@domain1.com sends an email to user2@domain2.com. In the second case user2@domain2.com sends an email to user1@domain1.com wherein privatecode.user2@domain2.com is in Bcc: field. In the third case user2@domain2.com sends an email to user3@domain3.com wherein privatecode.user2@domain2.com is again in Bcc: field. And in the forth case someaddress@somesite.com sends an email to invitationcode.user3@domain3.com. It should be noted that SASEP servers could be on the same domain as the users that use them are. It should also be noted that both users could use the same SASEP server.

The SASEP server for each user uses internally several lists. The list containing the unique message identifiers of email messages sent by a user, is named messagelist. Using this list, SASEP server is able to confirm to other SASEP server that the user did indeed send some email. The list containing email addresses of senders authorized to send email to the user wherein senders use SASEP, is named saseplist. The list containing email addresses of senders authorized to send email to the user wherein senders use only SMTP, is named smtplist. The list containing email addresses of senders authorized to send email to the user wherein senders that use only SMTP are compromised by at least one Spam email message where the faked email address from From: field is their email address, is named compromisedlist. The list containing email addresses of senders whose email messages will be blocked, is named blacklist. And at the end, the list containing local aliases to the public email address, is named invitationlist.

For each email message received on invitation email address, SASEP server's responsibility is to accept received email.

For each email message received on private email address, SASEP server has following responsibilities. When private email address is in Bcc: field, two things should be done. Firstly, the unique message id generated by SMTP server needs to be added to the messagelist. Secondly, email addresses of all recipients that are not already on any list needs to be added to the smtplist. When private email address is in To: field and word Spam in Subject: field, the following needs to be done. If sender of forwarded email is on the smtplist, it is necessary to move its email address to the compromisedlist. Otherwise, if sender of forwarded email is not on any list, it is necessary to add its email address to the blacklist. When private email address is in To: field, it is necessary to process other commands sent by the user in Subject: field as well. Those commands can be defined as SASEP extension.

For each email message received on public email address, SASEP server has following responsibilities. When the sender is on saseplist, it is necessary to perform a check if this sender did send received email and if so to accept it, otherwise to delete it. When the sender that can be moved to saseplist is on smtplist or compromisedlist, it is necessary to move the sender's email address to saseplist and it is necessary to process received email in the same way as in previous case. When the sender that cannot be moved to saseplist is on the smtplist, it is necessary to accept received email. The option for SASEP server is to add warning to the text from Subject: field or to perform some other action if required by the user. When the sender that cannot be moved to saseplist is on the compromisedlist, it is necessary to send automatic response to sender requesting confirmation that the sender sent received email that is required for its acceptance. The option for SASEP server is to perform some other action if required by the user. When the sender is on the blacklist, it is necessary to delete received email. Finally, when the sender is not on any list, it is necessary to send automatic response with challenge to sender requesting results to accept received email. The option for SASEP server is as well to perform some other action if required by the user.

In case the sender is on saseplist, the check can be performed, if this sender did send received email as follows. First, user's SASEP server (e.g. sasep1.userdomain.com) tries to establish communication with sender's SASEP server (e.g. sasep1.senderdomain.com), using unique message id of received email and unique authorization id generated by user's SASEP server as arguments. If positive response is received within predefined time, sender's SASEP server is informed that received email was accepted. Otherwise, the email is deleted while sender's SASEP server's responsibility is to inform the sender to re-send email.

In case the sender is on the smtplist or the compromisedlist, the check can be performed if this sender needs to be moved to saseplist as follows. First, user's SASEP server (e.g. sasep1.userdomain.com) tries to establish communication with sender's SASEP server (e.g. sasep1.senderdomain.com) using unique message id of received email and unique authorization id generated by user's SASEP server as arguments. If a positive response is received within predefined time, sender's SASEP server is informed that sender's email address was moved to saseplist. Sender's SASEP server stores authorization id and name of user's SASEP server if sender will request later to undo movement to saseplist. User's SASEP server stores required information to be able to process such request as well.

In case the sender is on compromisedlist, sending of request for confirming that the received email was sent by this sender can be performed as follows. First, user's SASEP server sends email message to sender's email address requesting only reply to this email wherein Subject: field contains unique message id of received email and unique authorization id generated by user's SASEP server. If positive response is received within the predefined time, the received email is accepted.

In case the sender is not on any list, sending of challenge requesting results to accept received email can be performed as follows. First, user's SASEP server (e.g. sasep1.userdomain.com) tries to establish communication with sender's SASEP server (e.g. sasep1.senderdomain.com), using as arguments unique message id of received email, unique authorization id generated by user's SASEP server and challenge request. If positive response is received within the predefined time, the received email is accepted. If SASEP servers cannot establish communication, user's SASEP server sends email message to sender's email address using same arguments wherein Subject: field contains unique message id of received email and unique authorization id generated by user's SASEP server. If a positive response is now received within the predefined time, the received email is accepted. Otherwise, the received email is deleted.

The challenge can be computational challenge, human challenge, micro-payment request, and potentially some other mechanism. Computational challenge can be e.g. the product of two prime numbers where those two prime numbers are the result, but it can also be something else. Human challenge can be image that contains word easily readable by person and hardly readable by image-processing algorithms, link to some web page where a person has to perform some task, but it can also be something else. A combination of two or more challenges is possible. The purpose of this is that challenge can be solved both by a person and by automating mechanism. In such case, it is expected that only the correct response of one of them is required.

A solution when automating mechanism can solve challenge does not imply that this is suitable for sending Spam. The challenge can additionally depend on the probability that received email is Spam.

As additional security measure, lists instead of email addresses can contain email address' signatures, where each email address needs a low computation effort for computing unique signature and for each signature it is an almost impossible effort to compute to which email it belongs. Accordingly, even if some hacker download lists, she/he will not be able to extract and potentially misuse email addresses.

With advanced client application or advanced SMTP server, private email address can be automatically added to Bcc: field of all outgoing email messages. Additionally, according to the automatic procedure to private email address only signatures of recipient email addresses and message-id can be sent. This can additionally decrease the effort each user has to use SASEP.

For enhancement of security in communication between two SASEP servers, additionally HTTP/SSL (HTTPS) protocol can be used.

Additional enhancement regarding email client and SASEP server is if at least one of them is able to perform computational task in background by using predefined percentage of processor power. Automating this task will additionally decrease the need for interaction from the users.

Advanced performance can be achieved by the functionality of SASEP server implemented jointly with the implementation of SMTP server. Also, SASEP server can be implemented as part of the hardware system like firewall, etc.

Also, it should be noted that hereby given principles can be applied when instead of email other types of messages are exchanged.

It is understood that many other modifications and variations may be devised given the above description of the guiding principles of the invention. It is intended that all such modifications and variations are considered to be within the spirit and scope of this invention, as defined in the following claims.

What is claimed is:

1. A method named Public/Private/Invitation Email Address Based Secure Anti-Spam Email Protocol (SASEP), for solving Spam problem and ensuring secure communication in a way acceptable to existing users of email, wherein it is of a special importance to insure technical characteristics as follows, a possibility for existing email users to send and receive email as defined by SASEP using already existing desktop programs and Internet portals which they already use for sending and receiving email and wherein all required after registrations is that an email address named a private-email-address has to be in Bcc: field of all outgoing email messages and that an email address named a public-email-address has to be used as user's main or reply email address, wherein automation of listed in the previous point is all that is required by vendors if they want their products to natively support SASEP, wherein once they supported SASEP their users can use SASEP even if they do not have any knowledge about it without need for any training and without need to spend additional time for sending and receiving email after migration on SASEP, wherein users can continue to use email for whatever they were using it before migration on SASEP, wherein after users have migrated on SASEP it is not possible any more to use the email address of one of them to send Spam to another one, wherein after migration on SASEP a communication with other users that have not migrated on SASEP yet is still supported, wherein for the case from the previous point where no method can stop Spam completely SASEP can reduce the amount of Spam from such sources, wherein with increase of the number of users that migrated on SASEP an efficiency of methods for sending Spam decreases and consequently an amount of Spam in global decreases as well, and wherein the method SASEP is defined with the following steps of which it is assembled and wherein these steps insure all previously listed technical characteristics if and only if they are used altogether, wherein the method comprising the steps for:
  a) registering and central managing to ensure the registration on SASEP server to users with standard desktop or web email client, standard outgoing email (SMTP) server and standard incoming email (POP3, IMAP or HTTP) server, wherein for each user it is ensured as follows: one email address which a user can use as regular email address or alias, named the public-email-address; one email address which has to be in Bcc: field of all outgoing email messages, named the private-email-address, which user can replace at any time with another private-email-address; and an arbitrary number of email addresses for registration on web sites, named invitation-email-addresses, which allow the user to obtain at any time any number of the invitation-email-addresses;
  b) managing of lists which internally uses all following lists for each user: a messagelist containing an unique message identifiers of all email messages sent by the user, wherein the unique message identifier can be a unique natural number; a saseplist containing email addresses of senders authorized to send email to a user, wherein senders use SASEP; a smtplist containing email addresses of senders authorized to send email to the user, wherein senders do not use SASEP and use only SMTP; a compromisedlist containing email addresses of senders authorized to send email to a user, wherein senders that use only SMTP are compromised by at least one Spam email message, where a faked email address from From: field is their email address and not the email address of a spammer who sent such a message; a blacklist containing email addresses of senders whose email messages will be blocked; and a invitationlist containing all invitation-email-addresses assigned to this user;
  c) processing emails received on the invitation-email-addresses, which for each email message received on the invitation-email-addresses ensures acceptance of the received email message;
  d) processing emails received on the private-email-address, which for each email message received on the private-email-address ensures implementation of all the following steps: when the private-email-address is in Bcc: field, the unique message identifier generated by SMTP server is added to the messagelist, and the email addresses of all recipients that are not already on some list are added to the smtplist; when the private-email-address is in To: field and the word Spam in Subject: field, if a sender of a forwarded email is on the smtplist, its email address is moved to the compromisedlist, otherwise if a sender of a forwarded email is not on any list, its email address is added to the blacklist; and when the private-email-address is in To: field, other commands sent by the user in Subject: field are processed as well, wherein these commands can be used to extend SASEP;
  e) processing emails received on the public-email-address, which for each email message received on the public-email-address ensures implementation of all the following steps: when a sender is on the saseplist, the step for processing emails received from the senders that are on the saseplist, is called, to perform a check if that sender sent the received email, if it is so, the received email message is accepted, otherwise the received email message is deleted; when the sender is on the smtplist or the compromisedlist, the step for migration on the saseplist, is called, to perform a check if this sender can be moved to the saseplist, and if it can be moved, the sender's email address is moved to the saseplist and the received email is processed in the same way as in the previous case, otherwise the received email is processed as follows; when the sender is on the smtplist, and the step for migration on the saseplist, concludes that the sender's email address can not be moved to the saseplist, the received email message is accepted, with an option to add warning to the text from Subject: field or to perform some other action if required by the user; when the sender is on the compromisedlist, and the step for migration on the saseplist, concludes that the sender's email address can not be moved to the saseplist, it calls the step for processing emails received from the senders that are on the compromisedlist, which sends automatic response to the sender requesting confirmation that the sender sent the received email which is required for its acceptance, and has option to perform some other action if required by the user; when the sender is on the blacklist, the received email is deleted; and when the sender is not on any list, the step for processing emails received from unknown senders, is called, which calls the step for generation of anti-spam challenge, and sends automatic response with anti-spam challenge to the sender requesting the results to accept the received email, and has the option to perform some other action if required by the user;
  f) processing emails received from senders that are on the saseplist, which ensures implementation of all the following steps: the user's SASEP server tries to establish communication with the sender's SASEP server, using as arguments a unique message identifier of the received email and unique authorization identifier generated by the user's SASEP server; if a positive response is received within predefined time, the sender's SASEP server is informed that the received email was accepted; and otherwise, the email is deleted while the sender's SASEP server's informs the sender to re-send email;
  g) migrating on the saseplist, which ensures implementation of all the following steps: the user's SASEP server tries to establish communication with the sender's SASEP server using as arguments a unique message identifier of received email and unique authorization identifier generated by the user's SASEP server; if a positive response is received within the predefined time, the sender's SASEP server is informed that the sender's email address was moved to the saseplist; the sender's SASEP server stores authorization identifier and name of the user's SASEP server if later the sender requests undoing movement to the saseplist; and the user's SASEP server also stores required information in order to be able to process such a request;

h) processing emails received from senders that are on the compromisedlist, which ensures implementation of all the following steps: the user's SASEP server sends email message to the sender's email address requesting only reply to this email wherein Subject: field contains a unique message identifier of the received email and unique authorization identifier generated by the user's SASEP server; and if a positive response is received within the predefined time, the received email is accepted, otherwise the received email is deleted;

i) processing emails received from unknown senders, which ensures implementation of all the following steps: the user's SASEP server tries to establish communication with the sender's SASEP server using as arguments a unique message identifier of the received email, unique authorization identifier generated by the user's SASEP server and anti-spam challenge request generated by the step for generation of anti-spam challenge which also used the step for assessment of probability that a received email message is Spam during generation of anti-spam challenge; if a positive response is received within the predefined time, the received email is accepted; if SASEP servers cannot establish communication, the user's SASEP server sends email message to the sender's email address using the same arguments, wherein Subject: field contains a unique message identifier of the received email and unique authorization identifier generated by the user's SASEP server; if a positive response is now received within the predefined time, the received email is accepted; otherwise the received email is deleted;

j) generation of anti-spam challenge, which as anti-spam challenge ensures at least one of the following: computational challenge, which can be a product of two prime numbers where those two prime numbers are a result; human challenge, which can be an image containing a word which needs to be entered in a requested field, or link to some web page where a person has to perform a certain task; micro-payment request; and any combination of the two or more previously listed challenges, wherein only a correct response on one of them is required;

k) assessment of probability that a received email message is Spam, which ensures computation of probability that a received email message is Spam using already existing methods for this purpose, so that it can be called from the step for generation of anti-spam challenge with a purpose to assign more demanding anti-spam challenges to these received email messages wherein it is higher probability that received email message is Spam;

l) conversion of email addresses into signatures, which ensures conversion of email addresses into signatures of email addresses or encrypted email addresses, with purpose to disable conversion from email addresses' signatures or encrypted email addresses into the original email address, so that it can be called from the step for management of the lists in order to have email addresses' signatures or encrypted email addresses on the lists, and not a original email addresses;

m) automation of using SMTP for sending email messages according to SASEP, which in simpler implementation ensures that the private-email-address can be automatically added to Bcc: field of all outgoing email messages by an advanced client application or an advanced SMTP server, and in complicated but more advanced implementation ensures that for all outgoing email messages to the private-email-address only the signatures of recipients' email addresses and message identifier are sent;

n) communicating with other SASEP servers, which ensures communication between SASEP servers using HTTP/SSL (HTTPS) protocol; and o) computation of anti-spam challenges, which ensures that email client or SASEP server can perform computational task of challenge in a background by using a predefined percentage of processor power, in order to automate the computation task and decrease the need for interaction by a user.

* * * * *